(12) United States Patent
Stav et al.

(10) Patent No.: US 9,889,579 B2
(45) Date of Patent: Feb. 13, 2018

(54) GYPSUM WALLBOARD AND METHOD OF MAKING SAME

(71) Applicant: National Gypsum Properties, LLC, Charlotte, NC (US)

(72) Inventors: Eli Stav, Charlotte, NC (US); Karen Fey, Indian Trail, NC (US); Gopalakrishnan Sethuraman, Charlotte, NC (US); Ma-Ikay Miatudila, Monroe, NC (US); Craig Robertson, Charlotte, NC (US); Joseph Bailey, Charlotte, NC (US)

(73) Assignee: National Gypsum Properties, LLC, Charlotte, NC (US)

( * ) Notice: Subject to any disclaimer, the term of this patent is extended or adjusted under 35 U.S.C. 154(b) by 785 days.

(21) Appl. No.: 14/476,078

(22) Filed: Sep. 3, 2014

(65) Prior Publication Data

US 2016/0060168 A1     Mar. 3, 2016

(51) Int. Cl.
| | | |
|---|---|---|
| *C04B 28/14* | (2006.01) | |
| *B28B 19/00* | (2006.01) | |
| *C08J 9/00* | (2006.01) | |
| C04B 103/48 | (2006.01) | |
| C04B 111/00 | (2006.01) | |

(52) U.S. Cl.
CPC .......... *B28B 19/0092* (2013.01); *C04B 28/14* (2013.01); *C08J 9/0066* (2013.01); *C04B 2103/48* (2013.01); *C04B 2111/0062* (2013.01)

(58) Field of Classification Search
CPC ....... C04B 28/14; C04B 24/026; C04B 24/32; C04B 24/383; C04B 38/10; C04B 40/0082; C04B 22/16; C04B 2103/48; C04B 2103/40; C04B 2103/0061; C04B 2111/0062; C08J 9/0066; B28B 19/0092
See application file for complete search history.

(56) References Cited

U.S. PATENT DOCUMENTS

| | | |
|---|---|---|
| 3,111,427 A | 11/1963 | Wagner |
| 4,018,618 A | 4/1977 | Petri et al. |
| 4,057,443 A | 11/1977 | Stiling et al. |
| 4,209,336 A | 6/1980 | Previte |
| 4,676,835 A | 7/1987 | Green et al. |
| 4,678,515 A | 7/1987 | Green et al. |
| 4,772,328 A | 9/1988 | Pfeifer |
| 5,085,929 A | 2/1992 | Bruce et al. |
| 5,116,671 A | 5/1992 | Bruce et al. |
| 5,151,130 A | 9/1992 | Croft et al. |
| 5,240,639 A | 8/1993 | Diez et al. |
| 5,258,072 A | 11/1993 | Gopalkirshnan et al. |
| 5,360,841 A | 11/1994 | Knop et al. |
| 5,466,393 A | 11/1995 | Diez et al. |
| 5,643,510 A | 7/1997 | Sucech |
| 5,783,549 A | 7/1998 | Gopalkirshnan et al. |
| 5,888,322 A | 3/1999 | Holland |
| 5,962,119 A | 10/1999 | Chan |
| 6,092,797 A | 7/2000 | You |
| 6,171,388 B1 | 1/2001 | Jobbins |
| 6,422,734 B1 | 7/2002 | Sethuraman et al. |
| 6,489,381 B1 | 12/2002 | Dreher et al. |
| 6,527,850 B2 | 3/2003 | Schwartz et al. |
| 6,545,067 B1 | 4/2003 | Buchner et al. |
| 6,617,387 B2 | 9/2003 | Dreher et al. |
| 6,656,994 B1 | 12/2003 | Dreher et al. |
| 6,706,128 B2 | 3/2004 | Sethuraman et al. |
| 6,783,587 B2 | 8/2004 | Sethuraman et al. |
| 6,803,396 B2 | 10/2004 | Gopalkirshnan et al. |
| 6,809,148 B1 | 10/2004 | Koppers et al. |
| 6,869,988 B2 | 3/2005 | Schwartz et al. |
| 6,936,099 B2 | 8/2005 | Ayambem |
| 7,008,990 B2 | 3/2006 | Raether et al. |
| 7,056,460 B2 | 6/2006 | Englert |
| 7,070,648 B1 | 7/2006 | Schwartz et al. |
| 7,202,319 B2 | 4/2007 | Spindler et al. |
| 7,261,772 B1 | 8/2007 | Schwartz et al. |
| 7,393,424 B2 | 7/2008 | Schwartz et al. |
| 7,399,355 B2 | 7/2008 | Szymanski et al. |
| 7,612,150 B2 | 11/2009 | Spindler et al. |
| 7,632,348 B2 | 12/2009 | Cowan et al. |
| 7,637,996 B2 | 12/2009 | Blackburn et al. |
| 7,655,710 B2 | 2/2010 | Hommer et al. |
| 7,776,461 B2 | 8/2010 | Blackburn et al. |
| 7,855,260 B2 | 12/2010 | Bichler et al. |
| 7,875,114 B2 | 1/2011 | Wittbold et al. |
| 8,016,961 B2 | 9/2011 | Martin et al. |
| 8,080,104 B2 | 12/2011 | Otsuka et al. |
| 9,181,132 B2* | 11/2015 | Lee ............................ B32B 3/26 |
| 9,221,719 B2* | 12/2015 | Stav ........................ C04B 28/14 |
| 9,328,025 B2* | 5/2016 | Blackburn ............... C04B 28/14 |
| 9,523,198 B2* | 12/2016 | Martin ................ B28B 19/0092 |
| 9,718,254 B2* | 8/2017 | Kumar .................... B32B 13/04 |
| 2001/0001218 A1 | 5/2001 | Luongo |
| 2002/0017222 A1 | 2/2002 | Luongo |
| 2002/0132946 A1 | 9/2002 | Kristenmacher et al. |

(Continued)

FOREIGN PATENT DOCUMENTS

| | | |
|---|---|---|
| JP | 63246212 | 10/1988 |
| WO | 9908978 | 2/1999 |
| WO | 9935103 A1 | 7/1999 |
| WO | 2003000620 A1 | 1/2003 |
| WO | 2008157479 A2 | 12/2008 |

*Primary Examiner* — Anthony J Green

(74) *Attorney, Agent, or Firm* — Dority & Manning, P.A.

(57) ABSTRACT

Compositions for gypsum board are disclosed, comprising a mixture of a gypsum slurry and a pre-generated foam and a coalescing agent. The coalescing agent comprises one or more coalescing agents that are added to the composition singly, separately or in combination to change the size and distribution of the air bubbles in the foamed gypsum slurry. The resulting gypsum cores have increased nail pull resistance and an improved facer/gypsum core bond.

26 Claims, 4 Drawing Sheets

(56) References Cited

U.S. PATENT DOCUMENTS

| | | |
|---|---|---|
| 2003/0010419 A1 | 1/2003 | Sethuraman |
| 2004/0028956 A1 | 2/2004 | Savoly et al. |
| 2004/0170873 A1 | 9/2004 | Smith |
| 2004/0231916 A1 | 11/2004 | Englert et al. |
| 2006/0278130 A1 | 12/2006 | Liu et al. |
| 2006/0281885 A1 | 12/2006 | Bichler |
| 2007/0227404 A1 | 10/2007 | Plank et al. |
| 2008/0000392 A1 | 1/2008 | Blackburn et al. |
| 2008/0009565 A1 | 1/2008 | Wittbold et al. |
| 2008/0009566 A1 | 1/2008 | Blackburn et al. |
| 2008/0057318 A1 | 3/2008 | Adzima et al. |
| 2008/0202415 A1 | 8/2008 | Miller et al. |
| 2009/0123727 A1 | 5/2009 | Martin et al. |
| 2010/0186870 A1 | 7/2010 | Stuart et al. |
| 2010/0210761 A1 | 8/2010 | Hommer et al. |
| 2011/0293916 A1 | 12/2011 | Martin et al. |
| 2012/0214887 A1 | 8/2012 | Stay et al. |
| 2012/0237756 A1 | 9/2012 | Lee et al. |
| 2016/0009598 A1* | 1/2016 | Lee .......................... B32B 3/26 428/219 |
| 2016/0031761 A1* | 2/2016 | Munie .................... C04B 28/14 106/678 |
| 2016/0159697 A1* | 6/2016 | Stav ........................ C04B 28/14 106/674 |
| 2017/0210671 A1* | 7/2017 | Hill ......................... C04B 28/14 |

* cited by examiner

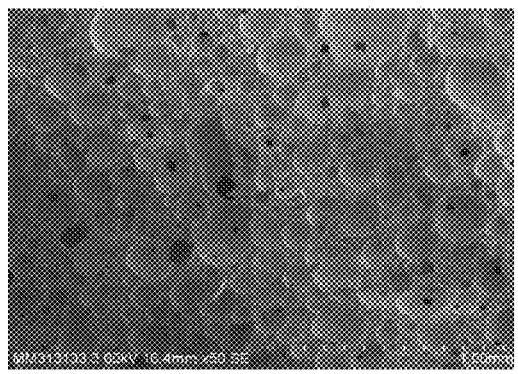 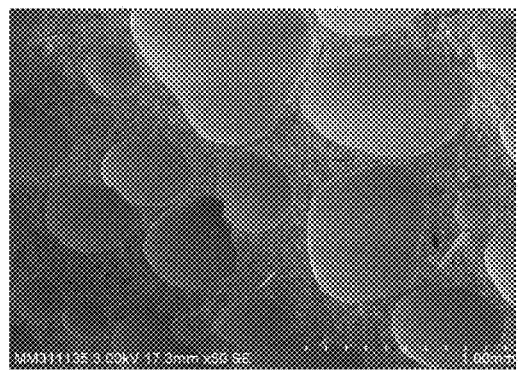
FIG. 1A　　　　　　　　　FIG. 1B
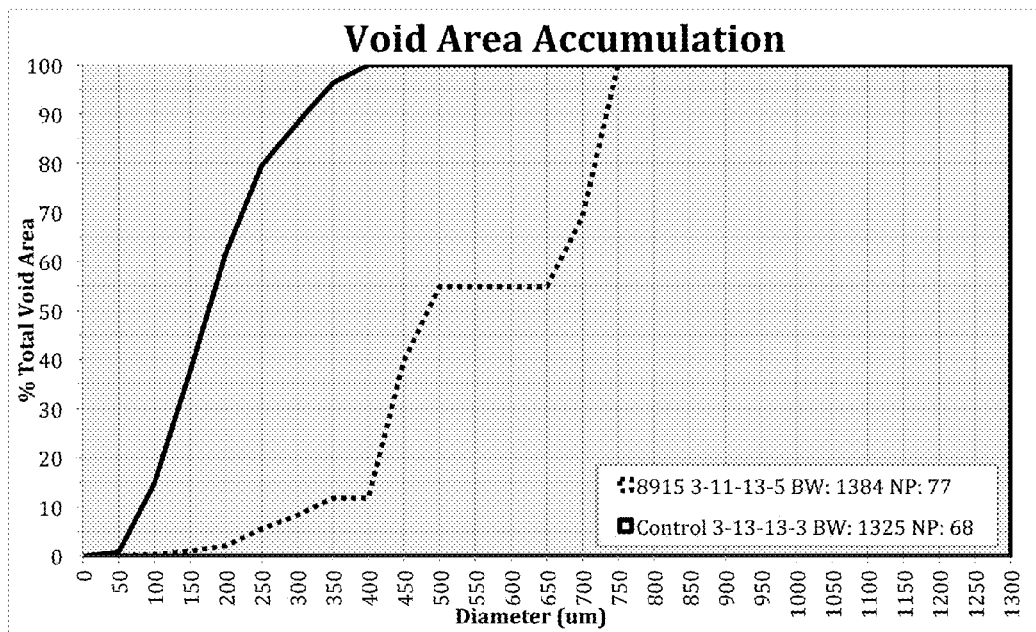
FIG. 2

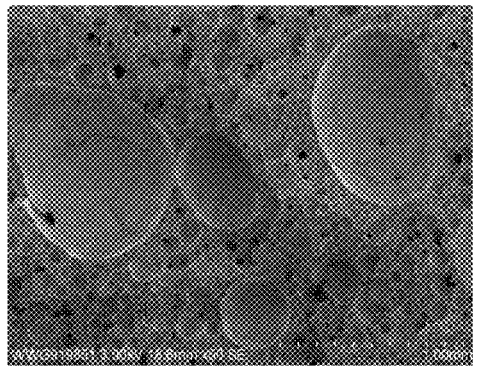 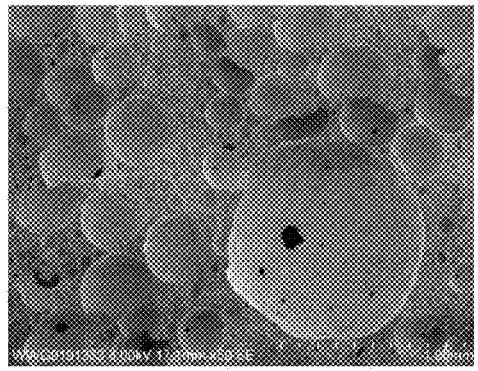
FIG. 5A  FIG. 5B
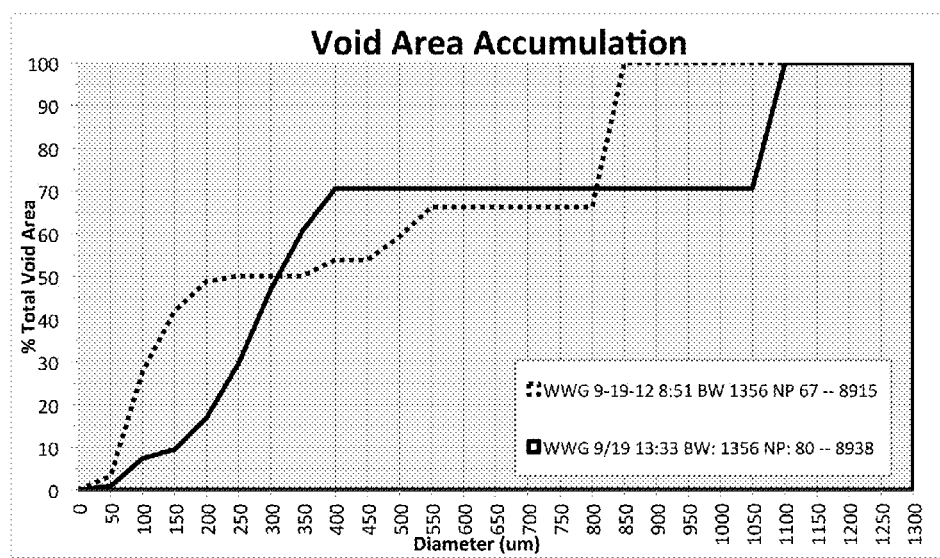
FIG. 6

GYPSUM WALLBOARD AND METHOD OF MAKING SAME

BACKGROUND OF THE INVENTION

The present invention generally relates to gypsum board, and more specifically to gypsum board formed from gypsum slurries mixed with foam and one or more coalescing agents.

DESCRIPTION OF THE RELATED ART

Gypsum board is typically formed as a composite material, comprising a gypsum layer or core that is sandwiched between two paper cover sheets or facers at the front (face) and back of the board. The physical properties of the gypsum board are influenced by the physical properties of the gypsum core, the facers and the facer/gypsum core bond.

Conventional gypsum cores have a foamed structure that comprises air bubbles dispersed in a solid matrix made mainly of intertwining gypsum crystals and, to a lesser extent, starch and other additives. The gypsum core is commonly produced as a homogenous mixture of a gypsum slurry and a pre-generated foam. Gypsum slurries are well known in the art and are typically prepared as a combination of dry and wet ingredients. The dry ingredients generally comprise calcium sulfate hemihydrate (stucco) combined with additives such as fiberglass, an accelerator, a natural polymer (e.g., starch) and/or other dry additives as are known in the art. The wet ingredients generally comprise a mixture of gauging water, paper pulp and other additives as are known in the art that can be added to the water or that come in a liquid state (e.g., retarder, etc.). The mixture of wet ingredients is often referred to as the "pulp paper solution", and provides a significant portion of the water that forms the gypsum slurry.

The foam is made using a foam generator and typically comprises foaming water, a foaming agent or soap, and air. The foam is continuously fed to the gypsum slurry in a mixing chamber or mixer to produce a foamed gypsum slurry. The air content of the gypsum core depends on the amount of foam and the efficiency and stability of the foam, as well as the other components used to form the gypsum core. The resulting gypsum core commonly contains about 50% to about 80% air by volume.

The foamed gypsum slurry exits the mixer and is transferred to a canister and then a boot, where it is discharged onto and spreads out over a moving, continuous bottom facing material. Alternatively, the foam may be introduced to the gypsum slurry in the canister and is discharged from the boot. A moving, continuous top facing material is placed atop the slurry, so that the slurry is sandwiched between the top and bottom facing materials to form the board. The board then passes through a forming station that forms the wallboard to the desired thickness and width. The board then travels along a belt line for several minutes, during which time the stucco rehydration reaction occurs, wherein the calcium sulfate hemihydrate reacts with water to form the gypsum crystal matrix and the board stiffens. The boards are then cut into a desired length and then fed into a large, continuous kiln for drying. During drying, the excess water (free water) is evaporated from the gypsum core while the chemically bound water is retained in the newly formed gypsum crystals.

The bubble structure—i.e. the size and distribution of the air bubbles in the gypsum core—affects the physical properties of the gypsum board, such as the nail pull resistance and other physical characteristics. In general, the wider and/or denser the solid matrix between the air bubbles, the stronger the gypsum core. For a given volume of air, compositions with a smaller number of large bubbles will tend to have a wider solid matrix between bubbles, compared to compositions with a greater number of smaller bubbles.

In recent years, the gypsum board industry has moved toward the production of wallboard that has reduced board weight, while maintaining all of the ASTM material standards. Controlling the size and distribution of the bubbles in the gypsum core has been one of the key methods used to reduce board weight while maintaining the facer/gypsum core bond and nail pull resistance. These efforts have largely been directed to controlling the foam stability. In conventional production methods, controlling foam stability and its interaction with the gypsum slurry when mixed together is a critical factor in controlling the size and distribution of the air bubbles in the gypsum core. As used herein, the gypsum slurry refers to the calcium sulfate hemihydrate (stucco) and additives in water as described above.

The size of the air bubbles in the gypsum core can be controlled by selecting a foaming agent having an appropriate stability. The use of less-stable foaming agents will increase the coalescence of the bubbles, which generally results in larger and more discrete air bubbles in the gypsum core. U.S. Pat. Nos. 5,085,929 and 5,116,671 to Bruce et al. describe the use of a low stability foam to improve the core structure. Examples of commercially available low stability foams include Alpha Foamer® (Stepan Co.—Northfield, Ill.), and Hyonic® PFM-10 and PFM-15 (GEO Specialty Chemical—Ambler, Pa.).

The stability of a foaming agent can be manipulated by various means known in the art, including varying the percentage of ethoxylated groups —$(OC_2H_4)$— in the foaming agent compound, changing its chain length, and modifying the ratio of linear and branched structures. An example of a stable soap that is commonly used in the industry is an ethoxylated C8 to C12 sulfonate compound having about 2.5% ethoxylated groups. An unstable soap is generally defined as a soap that has very little or no ethoxylated groups.

Alternatively, the bubble structure can be controlled by combining stable and unstable soaps in varying ratios. The combination of stable and unstable foaming agents can have a defined ratio (e.g., 85% unstable and 15% stable), or can have a ratio that varies based on changes in process parameters during production. U.S. Pat. No. 5,643,510 to Sucech describes a two-part soap system containing a blend of stable and unstable soaps. The ratio of stable/unstable soaps is adjusted to control the stability of the resulting foam and improve the core structure.

Although it is possible to adjust the ratio of stable/unstable soaps in situ at a production facility, this requires that a number of pre-blended stable/unstable soaps be available at the plant floor. Consequently, the use of a variable ratio of stable/unstable foaming agents involves the additional expense of maintaining an inventory of two or more soaps and multiple soap blends at the production facility. Thus, it would be desirable to have an alternative method of controlling the bubble structure of the gypsum core that may be readily adjusted in situ, without requiring the plant to maintain an inventory of multiple soaps and soap blends.

SUMMARY OF THE INVENTION

Gypsum slurry compositions are disclosed that comprise stucco, gauging water and a foam that comprises foaming water, a foaming agent and air, and first and second coalescing agents having different cloud point temperatures. The first and second coalescing agents have a blended cloud point temperature that is lower than the mix temperature. In one embodiment, the blended cloud point temperature is lower than the mix temperature by about 5° F. to about 30° F., and more preferably by about 5° F. to about 10° F.

In an alternative embodiment, a method for making a gypsum slurry composition is disclosed that comprises the steps of providing stucco and gauging water, generating a foam comprising foam water, a foaming agent and air, and mixing the stucco, gauging water and foam to form a gypsum slurry. First and second coalescing agents having different cloud point temperatures are added to the gypsum slurry, wherein the first and second coalescing agents have a blended cloud point temperature that is lower than the mix temperature. In one embodiment, the blended cloud point temperature is lower than the mix temperature by about 5° F. to about 30° F., and more preferably by about 5° F. to about 10° F.

In yet another embodiment, the method further comprises the step of determining the mix temperature of the gypsum slurry. The first and second coalescing agents are added in a ratio that provides a blended cloud point temperature that is lower that the mix temperature by about 5° F. to about 30° F., and more preferably by about 5° F. to about 10° F.

BRIEF DESCRIPTION OF THE DRAWINGS

FIGS. 1A and 1B are SEM images showing the bubble structure of gypsum boards produced without and with coalescing agent, respectively;

FIG. 2 is a data plot of the bubble diameter and total void area of the gypsum boards of FIGS. 1A and 1B;

FIGS. 5A and 5B are SEM images showing the bubble structure of gypsum boards produced with coalescing agents having different cloud points;

FIG. 6 is a data plot of the bubble diameter and total void area of the gypsum boards of FIGS. 5A and 5B;

DETAILED DESCRIPTION OF THE INVENTION

Figure 3:
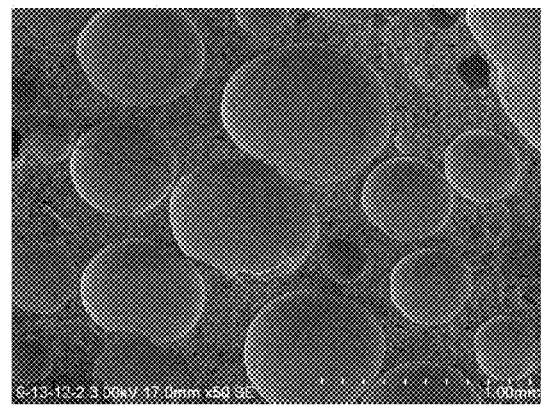
FIG. 3 is an SEM image showing the bubble structure of an ultra-light gypsum board produced with coalescing agent.

Compositions and methods for controlling the foam structure of a gypsum core are disclosed, that permit the weight of the gypsum board to be reduced while maintaining desirable board properties (e.g., nail pull resistance, humidified bond, deflection, etc.). The gypsum core composition comprises a mixture of a gypsum slurry, a pre-generated foam, and one or more coalescing agents. In a preferred embodiment, the pre-generated foam is formed using a stable soap. The bubble structure of the gypsum core is controlled by varying the ratio of the coalescing agent to the soap. In a further preferred embodiment, the bubble structure is controlled by varying the ratio between multiple coalescing agents and their ratios to the soap.

Previous efforts to control the foam structure have been directed to the use of defoaming agents and the sensitivity of the defoaming agent to the temperature of the gypsum core composition. The use of weak defoaming agents, such as polyamines or chemistries based upon polydimethylsiloxane with aminoalkyl and polyether groups, is described in U.S. Pat. No. 8,016,961 to Martin et al., which is incorporated herein by reference in its entirety. Such defoaming agents tend to cause the bubbles to simply collapse rather than coalesce together. Consequently, the use of defoaming agents may require increased amounts of soap to compensate for the loss of air volume.

In contrast to defoaming agents, coalescing agents tend to cause the bubbles to merge or fuse together into a larger bubble, which maintains the air volume (foam volume). Thus, the use of coalescing agents typically requires less soap compared to defoaming agents. The activity of the coalescing agent is affected by the temperature of the foamed gypsum slurry. Other process parameters may also affect the coalescing activity, including soap usage, foam weight (foam water and air), stiffening time, stucco particle size, fluidity (slump), water to stucco ratio, stucco impurities, and where the coalescing agent is added in the process.

In general, coalescing agents react and destabilize the bubbles in the foamed gypsum slurry, coalescing them into larger ones, when the temperature of the slurry approaches the cloud point ($T_{CP}$) of the coalescing agent—i.e. the temperature at which the coalescing agent solution loses clarity. For purposes of the coalescing reaction, the operative mix temperature of the slurry is believed to be at or near the initial mix temperature of the foamed gypsum slurry, which is largely determined by the temperature of the stucco (generally ranging between about 130° F. to 210° F.) and the water temperature. Although the stucco reaction is exothermic and increases the mix temperature, almost all of the heat of the exothermic reaction is evolved after the board becomes solid and the bubbles can no longer coalesce. Thus, the operative mix temperature for coalescing activity is believed to be at or near the initial mix temperature of the foamed gypsum slurry, while the slurry is still fluid.

It is generally desirable that the coalescing agent have a $T_{CP}$ that is lower than the mix temperature of the foamed gypsum slurry. If the mix temperature greatly exceeds the $T_{CP}$, the coalescing agent may become too active and can result in paper blisters and blows—i.e. small and large areas where the paper has separated from the gypsum core.

The mix temperature and other process parameters may change during a given day, week, or seasonally. Applicants have found that the cloud point of the coalescing agent may be adjusted by combining or blending multiple coalescing agents with different cloud points in varying ratios. This multiple coalescing agent system allows the coalescing reaction to be adjusted in situ during production, to quickly react to changes in the process parameters and provide increased flexibility to the manufacturing process. The coalescing agents may be added diluted or as is, separately or in tandem, and may introduced with different components of the composition and/or at different locations in the production process, such as by addition to the soap, foam water, gauging water, pulp water, to the mixer, canister, boot, slurry, and/or to the foam. The flexibility of changing the type, ratio, and introduction locations of the coalescing agents makes this process controllable and minimizes the risk of undesirable process issues such as blisters and blows or other quality issues. All these additions may be performed in situ to allow control of the foam structure in the gypsum core during the production process, although ex-situ preparations also are possible.

Coalescing agents are available that have cloud points ranging from about 60° F. to about 140° F. (16° C. to 60° C.). By combining coalescing agents with different cloud points and varying their ratios, it is possible to adjust the cloud point of the coalescing agent or coalescing agent blend within this range. Thus, the cloud point may be optimized for the specific mix temperature, fluidity and other process parameters that may change during a given day, week, or seasonally.

It is generally desirable to select coalescing agents that can be combined in varying ratios to adjust the blended $T_{CP}$ in a range that corresponds to the expected range of the operative mix temperature. The mix temperature is typically found to range from about 85° F. to about 120° F. The cloud point of the coalescing agent is preferably lower than or near the mix temperature.

In one embodiment, the combination of coalescing agents comprises a first coalescing agent that has a $T_{CP}$ that is about 68° F. and a second coalescing agent that has a $T_{CP}$ that is about 110° F. The mix temperature of the gypsum slurry can be determined during production and the ratio of the coalescing agents can readily be adjusted in situ to vary the blended $T_{CP}$ between 68° F. and 110° F., as may be appropriate for the determined mix temperature. In a preferred embodiment, the coalescing agent has a blended $T_{CP}$ that is lower than the mix temperature by about 5° F. to 30° F., and more preferably by about 5° F. to 10° F.

Applicants have found that controlling the ratio of coalescing agents to optimize the cloud point temperature relative to the mix temperature results in improved gypsum core void structures, nail pull resistance, and paper/gypsum core bonding. Board weight can be reduced while maintaining good board properties (nail pull, humidified bond, deflection, etc.). In addition, this adjustable coalescing agent system is much more flexible in reacting to parameter changes during the manufacturing process. By controlling the type, ratio, and introduction location of the coalescing agents or coalescing agent blend, the cloud point may be quickly and easily adjusted to achieve the desired bubble structure. This approach gives the ability to immediately react to variations in mix temperature, mix fluidity (slump) and other process parameters including, soap usage, foam weight, stiffening time, stucco particle size, water to stucco ratio, etc., by adjusting the amount and/or ratio of the coalescing agents to achieve the desired core structure and to reduce or eliminate the tendency to form blisters or blows, or other quality issues.

This system also allows the manufacturing plants to use one soap type for all products and to use the coalescing agent only for products on an as needed basis. The amount of coalescing agent added to the soap (percentage of coalescing agent on soap) can be changed for each product to meet the physical property requirements for a given product type (i.e. strength, weight, etc.). Generally, the usage level of the coalescing agent on a soap basis can vary from plant to plant and it depends on process parameters such as mix fluidity, mix temperature, soap usage, setting time, type of stucco, the location where the foam is added, the location where the coalescing agent is added and other process factors. In one embodiment, the usage level of the coalescing agent can vary from 1% up to 25% on soap.

The levels of coalescing agents or blends can be controlled through feed and control systems. The coalescing agents can be pre-blended in various ratios or added in a holding tank or mixing tank prior to addition to the foam, and can be introduced to the foam separately or in tandem, either diluted or as is. The coalescing agents can also be introduced at different entry locations in the manufacturing process—e.g., added to the soap, foam water, gauging water, pulp water, to the mixer, boot, canister, slurry, and/or to the foam. Alternatively, the coalescing agents may be added directly to the foam at a later stage. All these additions may be done in situ in order to control the distribution of the foam bubbles in the gypsum core during the manufacturing process. Ex-situ methods are also possible.

In a preferred embodiment, the coalescing agents have a delayed coalescing activity that takes place within the stiffening time of the mix, and not spontaneously. Thus, within a few seconds after the coalescing agent is mixed with the foamed slurry, the coalescing action starts and the size and distribution of the air voids in the core changes. For example, methods for delaying the action of a coalescing agent based on the mix temperature are known in the art, as described in U.S. Patent Publication No. 2012/0237756 to Lee et al., which is also incorporated herein in its entirety. The coalescing reaction does not happen immediately, but is time dependent and typically starts within a few seconds after the coalescing agent is mixed with the foamed slurry. The coalescing action continues until the mixture is set or stiff enough that it no longer allows the bubbles to coalesce.

In one embodiment, the coalescing agent comprises a polyether block copolymer surfactant, such as are commercially available from BASF Corporation (Florham Park, N.J.). In a preferred embodiment, the coalescing agent is an ethylene oxide-propylene oxide block copolymer (i.e. EO/PO), and more preferably a reverse block copolymer (i.e. PO/EO). It is further preferred that the coalescing agent has an ethylene oxide (EO) or hydrophilic block content of from about 10 to about 50 wt %. In the case of a block copolymer, the EO content is preferably in the range of between about 20 to about 45 wt %, and in the case of a reverse block copolymer, the EO content is preferably in the range of between about 20 to about 45 wt %.

In an alternative embodiment, the coalescing agent comprises an alkoxylated alcohol surfactant, such as a fatty alcohol alkoxylate. Exemplary alkoxylated alcohol surfactants are commercially available from BASF Corporation, and comprise the reaction product of linear and/or branched alcohol(s) and a mixture of propylene oxide and ethylene oxides, containing a mixed chain of propylene oxide and ethylene oxide terminated by a hydroxyl group. In a preferred embodiment, the alcohol contains 6 to 18 carbon atoms and the number of moles of lower alkylene oxide (2 or 3 carbon atoms) is from 3 to 12. In a particularly preferred embodiment, the alkoxylated alcohol surfactant comprises a $C_6$-$C_{10}$ fatty alcohol condensed with 6 to 12 moles of ethylene oxide and 3 moles of propylene oxide.

In another embodiment, the coalescing agent has a hydrophilic-lipophilic balance of from about 1 to about 31, or about 1 to about 15. In the case of an EO/PO block copolymer, the hydrophilic-lipophilic balance is preferably in a range of between about 7 to about 15, and in the case of a reverse block copolymer, the hydrophilic-lipophilic balance is preferably in a range of between about 1 to about 7.

In yet another embodiment, the coalescing agent has an average molecular weight of from about 1000 to about 4000. In the case of an EO/PO block copolymer, the average molecular weight is preferably in a range of between about 2000 to about 3500, and in the case of a reverse block copolymer, the average molecular weight is preferably in a range of between about 2000 to about 3500.

The following examples and the techniques disclosed herein are included to demonstrate embodiments that have been found to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLE 1

Gypsum board having improved nail pull strength was produced using coalescing agents. Foamed gypsum slurries were prepared and gypsum boards were formed in the laboratory, with and without a coalescing agent as set forth in Table I. Board 1 was a control board made with no coalescing agent. Board 2 was made with the coalescing agent Lumiten 4425 (BASF 8915). Additional components of the gypsum slurry include: a ball mill accelerator, BMA (National Gypsum Company); a retarder, Plast Retard L (SICIT 2000 SpA); a dispersant, Gypflow TF (Handy Chemicals); and a surfactant, Cedapal (Stepan Company).

TABLE I

Composition of Boards 1 and 2

|  | Board 1 (control) | Board 2 (4425) |
| --- | --- | --- |
| Stucco | 700 g | 700 g |
| BMA | 9.0 g | 9.0 g |
| Potash | 0.2 g | 0.2 g |
| Dextrose | 0.8 g | 0.8 g |
| Pulp | 1.2 g | 1.2 g |
| Starch - Acid | 13.0 g | 13.0 g |
| Modified Gypflow Dispersant | 4.0 g | 4.0 g |
| Plast L | 0.04 g | 0.04 g |
| Lumiten 4425 | 0 | 10.0% on soap |
| Cedapal | 0.41 g | 0.39 g |
| Water (total) | 656.8 g | 653.1 |

The board weight and nail pull resistance of the resulting boards was measured as described in ASTM C 473 Standard Test Methods for Physical Testing of Gypsum Panel Products. The bubble structure of the gypsum cores was analyzed by scanning electron microscopy (SEM) at 50× magnification. The photographs of FIG. 1A (Board 1) and FIG. 1B (Board 2) are representative of the bubble structure of the gypsum cores, and correspond to an area of 5.0 mm². The percentage of small bubbles in the gypsum core having a diameter less than 150 μm (<150), the diameter of the bubbles at the mid-point of the size distribution (MP), the number of bubbles in the area of the photograph (Count), and the total area of air or void area of the gypsum core (VA) in the analyzed area (5.0 mm²) were measured and are shown in Table II. The bubble size distribution is shown in FIG. 2.

TABLE II

Bubble Structure Analysis of Boards 1 and 2

|  | BW (lb/msf) | NP (lbf) | <150 (%) | MP (μm) | Count | VA (%) |
| --- | --- | --- | --- | --- | --- | --- |
| Board 1 | 1325 | 68 | 36 | 175 | 236 | 66.7 |
| Board 2 | 1384 | 77 | 1 | 485 | 18 | 50.5 |

The data in Table II and FIG. 2 shows that the presence of a coalescing agent reduces the number of small bubbles and increases the number or amount of large and discrete bubbles—i.e. as shown by the substantial reduction in percentage of small bubbles (<150) and the increase in bubble size at the mid-point (MP).

The data also shows that the coalescing agent does not act as a strong defoamer, but instead acts to coalesce the small bubbles into larger ones. The number of air bubbles in the control is dramatically reduced from 236 in the control to 18 with coalescing agent, whereas the void area (VA) is only reduced from 67% in the control to 50.5% with coalescing agent. Similarly, FIG. 2 shows that the presence of a coalescing agent results in a narrow distribution of larger bubbles in comparison to the control, which has a wide distribution of small and large bubbles. These changes in bubble structure produced by the coalescing agent also increases the width of the solid matrix between bubbles (as shown in FIG. 1B), which is believed to result in an increased nail pull resistance. Furthermore, this data shows that desirable core void structures and resulting board properties can be achieved using coalescing agents without increasing the amount of soap used in the system, as is generally required using defoaming agents.

EXAMPLE 2

Gypsum board having reduced weight and increased nail pull resistance was produced by adjusting the relative concentration of coalescing agent. A foamed gypsum slurry was prepared as set forth in Table III, and gypsum boards formed as described in Example 2 above.

TABLE III

Composition of Board 3

| Stucco | 640 g |
| --- | --- |
| BMA | 13.0 g |
| Phosphate | 2.0 g |
| Starch - Blend | 15.0 g |
| Gypflow Dispersant | 10.0 g |
| Plast L | 0.04 g |
| Lumiten 4426 | 15% on soap |
| Cedapal | 0.56 g |
| Water (total) | 800 g |

TABLE IV

Bubble Structure Analysis of Board 3

|  | BW (lb/msf) | NP (lbf) | <150 (%) | MP (μm) | Count | VA (%) |
| --- | --- | --- | --- | --- | --- | --- |
| Board 3 | 1233 | 83 | 1 | 570 | 21 | 58.1 |

Figure 4:
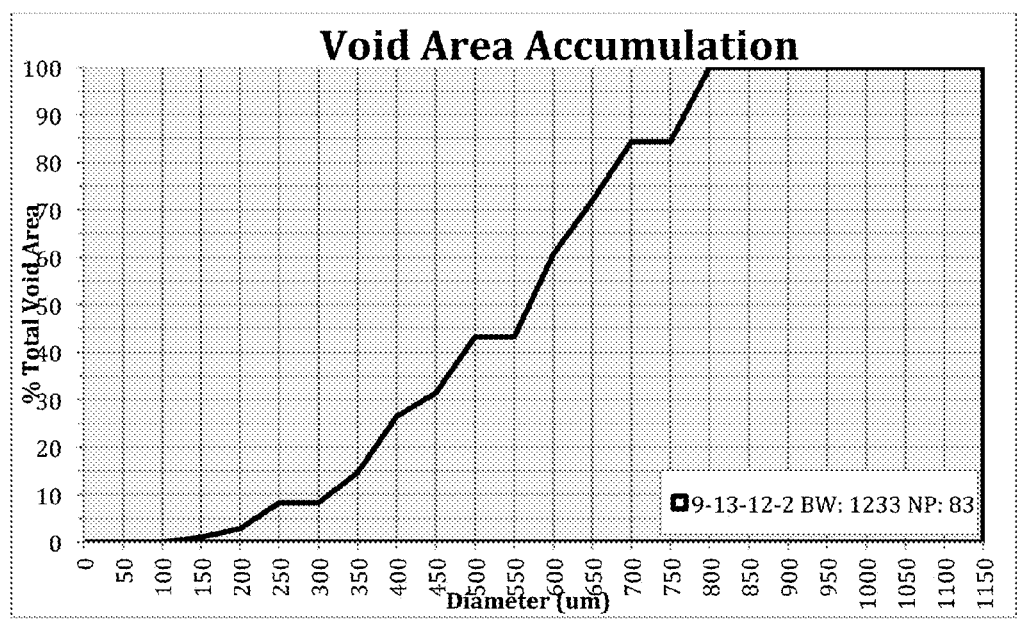
FIG. 4 is a data plot of the bubble diameter and total void area of the gypsum board of FIG. 3.

The board weight and nail pull resistance of the gypsum board (Board 3) was measured and the bubble structure of the gypsum core was analyzed by SEM, as described in Example 1 above. The bubble structure is shown in FIG. 3 and the resulting data shown in Table IV and FIG. 4. The data shows that the coalescing agent can be adjusted relative to the other components of the gypsum slurry to produce an ultra-light gypsum board (BW<1300 lb/msf), while increasing the nail pull resistance. Board 3 has a board weight of 1233 lb/msf and a nail pull resistance of 83 lbf, in comparison to the Board 1 control which has a board weight of 1325 lb/msf and a nail pull resistance of 68 lbf.

EXAMPLE 3

The relationship between the cloud point and the mix temperature was investigated by preparing foamed gypsum slurries using coalescing agents with different cloud points, Lumiten 4425 (Board 4) and Lumiten 4426 (BASF 8938) (Board 5). The gypsum slurry had a mix temperature of 119° F., which was very high compared to the cloud point of Lumiten 4425 ($T_{CP}$ 68° F.). The high mix temperature resulted in a very aggressive coalescing action, which produced blisters and blows. To overcome the aggressive coalescing action, it was necessary to reduce the amount of coalescing agent to the point where it was insufficient to coalesce the small bubbles into large bubbles, as shown in FIG. 5A.

Lumiten 4426 has a higher cloud point ($T_{CP}$ 87° F.) than Lumiten 4425, which permitted a four-fold increase in the amount of coalescing agent in the gypsum slurry—enough to coalesce the small bubbles into large and discrete bubbles, as shown in FIG. 5B. The gypsum board produced using Lumiten 4426 (Board 5) exhibited a higher nail pull resistance and better paper/core bonding in comparison to Lumiten 4425 (Board 4), as shown in Table V. The bubble size distribution is shown in FIG. 6.

TABLE V

Bubble Structure Analysis of Boards 4 and 5

| | BW (lb/msf) | NP (lbf) | <150 (%) | MP (μm) | Count | VA (%) |
|---|---|---|---|---|---|---|
| Board 4 | 1356 | 67 | 42 | 250 | 325 | 64.9 |
| Board 5 | 1356 | 80 | 9 | 305 | 114 | 63.3 |

EXAMPLE 4

The cloud point of the coalescing agent can be adjusted using varying combinations or blends of coalescing agents with different cloud points. Coalescing agents were prepared as 1% solutions in water of different blends of Lumiten 4426 and Lumiten 4425, containing 0%, 20%, 40%, 60% 80% and 100% Lumiten 4426 (with Lumiten 4425 as the remainder). The cloud point of the coalescing agents was determined by measuring the initial temperature at which the solution exhibits the first discernible change in opacity and begins to lose clarity, and the temperature at which the solution became fully opaque (i.e. when the thermometer bulb measuring the temperature of the solution in the middle of a beaker is no longer visible).

TABLE VI

Blended Coalescing Agent Cloud Point

| Coalescing Agent Blend | Initial Change In Opacity (° F.) | Fully Opaque (° F.) |
|---|---|---|
| 100% Lumiten 4426 | 92 | 115 |
| 80% Lumiten 4426/20% 4425 | 87 | 97 |
| 60% Lumiten 4426/40% 4425 | 82 | 92 |
| 40% Lumiten 4426/60% 4425 | 79 | 91 |
| 20% Lumiten 4426/80% 4425 | 77 | 89 |
| 100% Lumiten 4425 | 78 | 88 |

Figure 7:
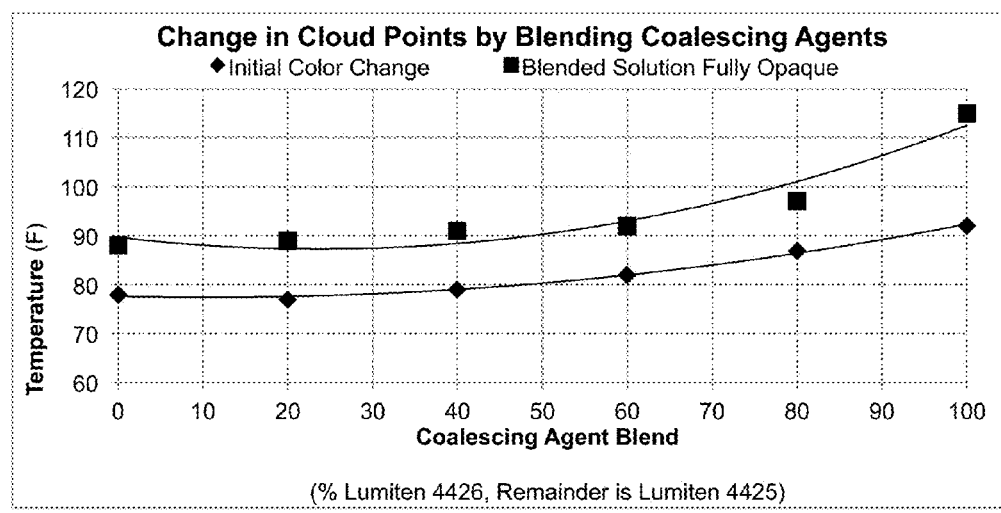
FIG. 7 is a data plot of the cloud points of blends of two different coalescing agents in varying ratios.

The cloud point results are shown in Table VI and FIG. 7. By combining Lumiten 4426 and Lumiten 4425 in different ratios, the cloud point of the coalescing agent can be continuously adjusted in a range between the $T_{CP}$ of Lumiten 4426 and the $T_{CP}$ of Lumiten 4425. Thus, it is possible to use either one coalescing agent or a combination of coalescing agents in gypsum core compositions. During production, the ratio of the coalescing agents can be changed in situ to adjust the cloud point, as may be required to accommodate changes in the mix temperature or other process parameters during production. In addition, the results show that it is possible to double the amount of coalescing agent without generating blisters or blows.

While various embodiments have been described, it will be apparent to those of ordinary skill in the art that many more embodiments and implementations are possible within the scope of the invention. Accordingly, the invention is not to be restricted except in light of the attached claims and their equivalents.

What is claimed is:

1. A foamed gypsum slurry composition, comprising:
   stucco;
   gauging water;
   a foam comprising foaming water, a foaming agent and air;
   a first coalescing agent having a first cloud point temperature; and
   a second coalescing agent having a second cloud point temperature that is different from the first cloud point temperature;
   wherein the foamed gypsum slurry composition has a mix temperature, and the first and second coalescing agents have a blended cloud point temperature that is lower than the mix temperature.

2. The foamed gypsum slurry composition of claim 1, wherein the blended cloud point temperature is lower than the mix temperature by about 5° F. to about 30° F.

3. The foamed gypsum slurry composition of claim 1, wherein the blended cloud point temperature is lower than the mix temperature by about 5° F. to about 10° F.

4. The foamed gypsum slurry of claim 1, wherein the first coalescing agent has a cloud point temperature of about 68° F., and the second coalescing agent has a cloud point temperature of about 110° F.

5. The foamed gypsum slurry of claim 1, wherein the first or second coalescing agent is a polyether block copolymer surfactant.

6. The foamed gypsum slurry of claim 5, wherein the polyether block copolymer surfactant is an ethylene oxide-propylene oxide block copolymer and/or reverse block copolymer.

7. The foamed gypsum slurry of claim 1, wherein the first or second coalescing agent is an alkoxylated alcohol surfactant.

8. The foamed gypsum slurry of claim 7, wherein the alkoxylated alcohol surfactant is a fatty alcohol alkoxylate.

9. The foamed gypsum slurry of claim 1, wherein the first and/or second coalescing agent has a delayed coalescing activity.

10. A method for making a foamed gypsum slurry composition, comprising the steps of:
    providing a gypsum slurry comprising stucco and gauging water;
    generating a foam comprising foam water, a foaming agent and air;
    introducing the foam to the gypsum slurry to form a foamed gypsum slurry having a mix temperature;
    adding a first coalescing agent to the foamed gypsum slurry, the first coalescing agent having a first cloud point temperature; and
    adding a second coalescing agent to the foamed gypsum slurry, the second coalescing agent having a second cloud point temperature that is different from the first cloud point temperature;
    wherein the first and second coalescing agents have a blended cloud point temperature that is lower than the mix temperature.

11. The method of claim 10, wherein the first and second coalescing agents have a blended cloud point temperature that is lower than the mix temperature by about 5° F. to about 30° F.

12. The method of claim 10, wherein the first and second coalescing agents have a blended cloud point temperature that is lower than the mix temperature by about 5° F. to about 10° F.

13. The method of claim 10, further comprising the steps of:
determining the mix temperature of the foamed gypsum slurry; and
adjusting the ratio of the first and second coalescing agents to provide a blended cloud point temperature that is lower that the mix temperature.

14. The method of claim 13, wherein the first and second coalescing agents have a blended cloud point temperature that is lower than the mix temperature by about 5° F. to about 30° F.

15. The method of claim 13, wherein the first and second coalescing agents have a blended cloud point temperature that is lower than the mix temperature by about 5° F. to about 10° F.

16. The method of claim 10, wherein the first coalescing agent has a cloud point temperature of about 68° F., and the second coalescing agent has a cloud point temperature of about 110° F.

17. The method of claim 10, wherein the first and second coalescing agents are added to the foamed gypsum slurry by mixing with a component of the composition selected from the group consisting of: the gypsum slurry, the gauging water, the foam water, the foaming agent, the foam, and combinations thereof.

18. The method of claim 17, wherein the first and second coalescing agents are added separately to the foamed gypsum slurry by mixing with different components of the composition.

19. The method of claim 10, further comprising the steps of:
transferring the gypsum slurry from a mixer to a canister and to a boot; and
introducing the foam to the gypsum slurry in the mixer or the canister; and
wherein the first and second coalescing agents are added to the foamed gypsum slurry at a location selected from the group consisting of: the mixer, the canister, the boot, and combinations thereof.

20. The method of claim 19, wherein the first and second coalescing agents are added separately to the foamed gypsum slurry at different locations.

21. The method of claim 10, wherein the first or second coalescing agent is a polyether block copolymer surfactant.

22. The method of claim 21, wherein the polyether block copolymer surfactant is an ethylene oxide-propylene oxide block copolymer and/or reverse block copolymer.

23. The method of claim 10, wherein the first or second coalescing agent is an alkoxylated alcohol surfactant.

24. The method of claim 23, wherein the alkoxylated alcohol surfactant is a fatty alcohol alkoxylate.

25. A method for making a gypsum board, comprising the steps of:
providing a gypsum slurry comprising stucco and water;
generating a foam comprising water, a foaming agent and air;
introducing the foam to the gypsum slurry to form a foamed gypsum slurry having a mix temperature;
determining the mix temperature of the foamed gypsum slurry;
adding a first coalescing agent to the foamed gypsum slurry, the first coalescing agent having a first cloud point temperature;
adding a second coalescing agent to the foamed gypsum slurry, the second coalescing agent having a second cloud point temperature that is different from the first cloud point temperature, wherein the first and second coalescing agents are added in a ratio that provides a blended cloud point temperature that is lower that the mix temperature by about 5° F., to about 30° F.;
applying the foamed gypsum slurry to a first facing material;
applying a second facing material atop the foamed gypsum slurry to sandwich the foamed gypsum slurry between the first and second facing materials;
forming the foamed gypsum slurry to a desired thickness; and
drying the foamed gypsum slurry to form a board.

26. The method of claim 25, wherein the first and second coalescing agents are added in a ratio that provides a blended cloud point temperature that is lower that the mix temperature by about 5° F. to about 10° F.

* * * * *